(12) United States Patent
Green et al.

(10) Patent No.: US 7,469,880 B2
(45) Date of Patent: Dec. 30, 2008

(54) QUICK CONNECT FEATURE FOR A FLUID CONNECTION

(76) Inventors: Ronald D. Green, 29820 Cobblestone La., New Hudson, MI (US) 48165; William Franklin Turnau, III, 43509 Argonne Ct., Canton, MI (US) 48188; Joseph P. Schutte, 7380 Woodview, Apt. 4, Westland, MI (US) 48185; David S. Malone, 3120 Greenwood Rd., Attica, MI (US) 48412; Michael J. Andre, 6485 Lake Meadow Dr., Waterford, MI (US) 48327

(*) Notice: Subject to any disclaimer, the term of this patent is extended or adjusted under 35 U.S.C. 154(b) by 198 days.

(21) Appl. No.: 11/377,937

(22) Filed: Mar. 16, 2006

(65) Prior Publication Data

US 2006/0284414 A1    Dec. 21, 2006

Related U.S. Application Data

(60) Provisional application No. 60/662,266, filed on Mar. 16, 2005.

(51) Int. Cl.
*F16K 51/00*    (2006.01)

(52) U.S. Cl. .................. 251/148; 251/151; 285/304; 285/305

(58) Field of Classification Search .............. 251/148, 251/151; 285/305, 319, 307, 147.1, 148.21, 285/148.26, 188, 190, 210, 322, 323
See application file for complete search history.

(56) References Cited

U.S. PATENT DOCUMENTS

| 4,655,482 | A  | * | 4/1987 | Myers et al. .................. 285/81 |
| 5,946,746 | A  |   | 9/1999 | Bloom |
| 6,360,770 | B1 |   | 3/2002 | Buchner et al. |
| 6,684,906 | B2 |   | 2/2004 | Burns et al. |
| 6,918,400 | B2 |   | 7/2005 | Buchner et al. |
| 2004/0169372 | A1 |   | 9/2004 | LeMay et al. |
| 2005/0134040 | A1 | * | 6/2005 | Andre ........................ 285/305 |

* cited by examiner

*Primary Examiner*—Stephen M. Hepperle
*Assistant Examiner*—Atif H Chaudry
(74) *Attorney, Agent, or Firm*—Carlson, Gaskey & Olds PC

(57) ABSTRACT

A stub-out assembly includes a stub-out conduit that defines a major diameter and a minor diameter. The minor diameter defines an attachment groove for receipt of a mount housing and a valve housing. The mount housing includes a multitude of circumferential fingers which each include a barbed end that engage a corresponding internal groove within the valve housing of the valve assembly. The mount housing fits over the minor diameter and a retainer in the mount housing is aligned with the attachment groove. The retainer includes a partially annular set of conduit attachment legs and a set of housing attachment legs. The conduit attachment legs engage the attachment groove to axially retain the conduit therein. The housing attachment legs each include a barbed end which engage a corresponding surface located within the slot.

10 Claims, 6 Drawing Sheets

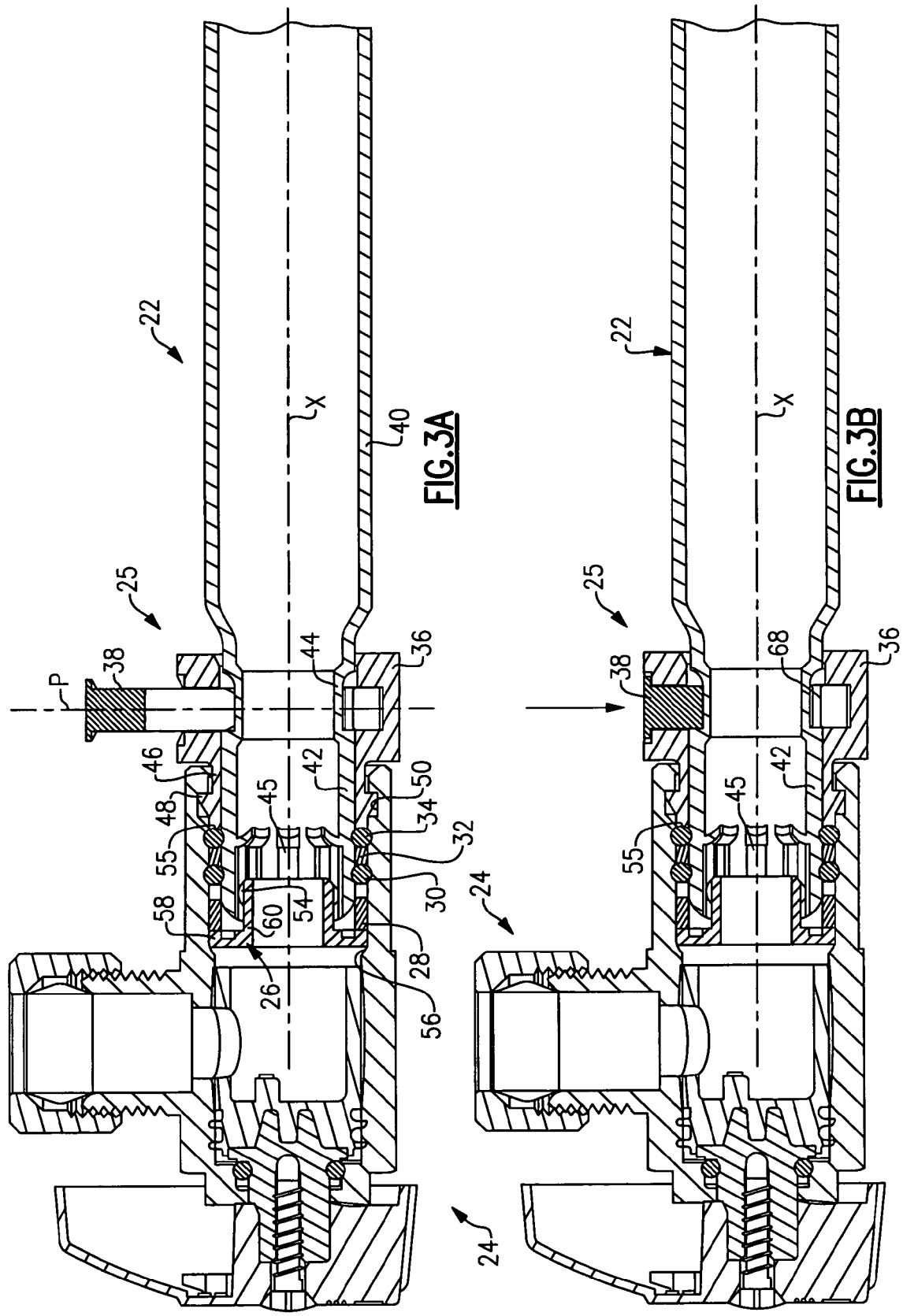

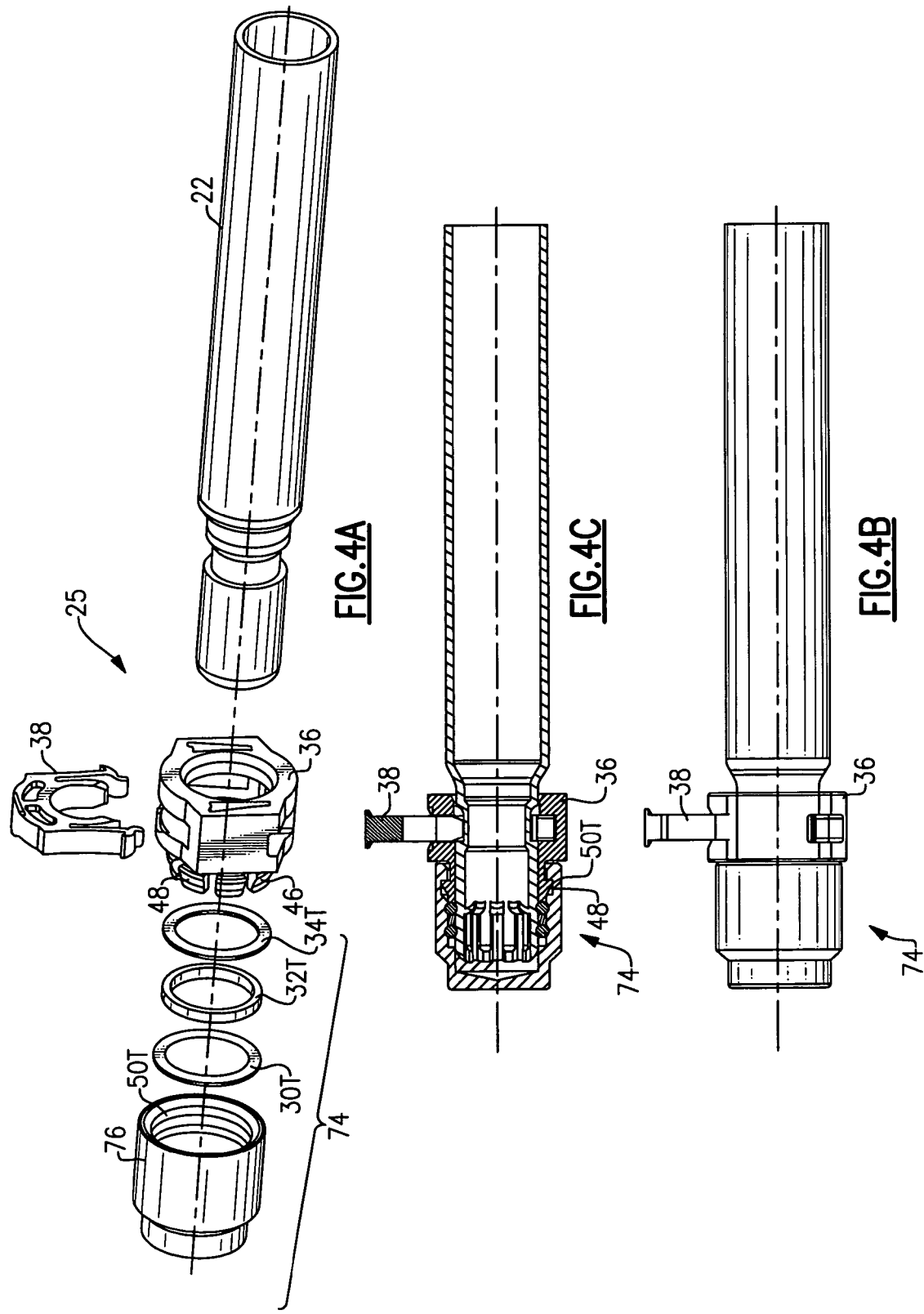

US 7,469,880 B2

QUICK CONNECT FEATURE FOR A FLUID CONNECTION

The present application claims priority to U.S. Provisional Patent Application Ser. No. 60/662,266, filed 16 Mar. 2005.

BACKGROUND OF THE INVENTION

The present invention relates to a quick connect, and more particularly to a stub-out with a unique end form connection arrangement.

Current practice during building construction is to complete the rough-in plumbing at a plumbing fixture location by providing a stub-out pipe, generally a relatively small diameter copper capped pipe so that the rough plumbing may be checked for leaks, etc. Then later, other plumbers return to install the fixtures. Considerable time may be spent during the installation of a multitude of valve assemblies typical of each plumbing fixture. Although effective, attachment of a valve assembly to each stub-out typically requires brazing, threading, compression or other relatively time consuming procedure.

Accordingly, it is desirable to provide a quick connect feature for a stub-out conduit which minimizes the shutting of main water valves and draining of the respective stub-out pipes.

SUMMARY OF THE INVENTION

A stub-out assembly according to the present invention includes a stub-out conduit that defines a major diameter and a minor diameter. The minor diameter defines an attachment groove for receipt of a mount housing which connects to a valve housing. An internal structure such as a multitude of splines, are engageable with an anti-rotation disc within the valve assembly to rotationally fix the valve housing on the stub-out conduit. The mount housing essentially "snaps" into the valve housing to retain the valve assembly in a desired rotational orientation.

The mount housing includes a multitude of circumferential fingers which each include a barbed end that engage a corresponding internal groove within the valve housing of the valve assembly. The mount housing fits over the minor diameter and a retainer in the mount housing is aligned with the attachment groove. The retainer includes a partially annular set of conduit attachment legs and a set of housing attachment legs. The conduit attachment legs engage the attachment groove to axially retain the conduit therein and the housing attachment legs each include a barbed end which engage a corresponding surface located within the housing slot to retain the retainer to the housing.

The present invention therefore provides a quick connect feature for a stub-out conduit which minimizes the shutting of main water valves and draining of the respective stub-out pipes.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3A is a sectional view of the stub-out assembly taken along the length thereof in an unlocked position;

FIG. 3B is a sectional view of the stub-out assembly taken along the length thereof in an locked position;

FIG. 4A is an exploded view of test cap assembly for use with the stub-out conduit;

FIG. 4B is a side view of the stub-out assembly taken along the length thereof with the test cap assembly attached but the retainer unlocked;

FIG. 4C is a sectional view of the stub-out assembly taken along the length thereof with the test cap assembly attached but the retainer unlocked;

DETAILED DESCRIPTION OF THE PREFERRED EMBODIMENT

Figure 1:
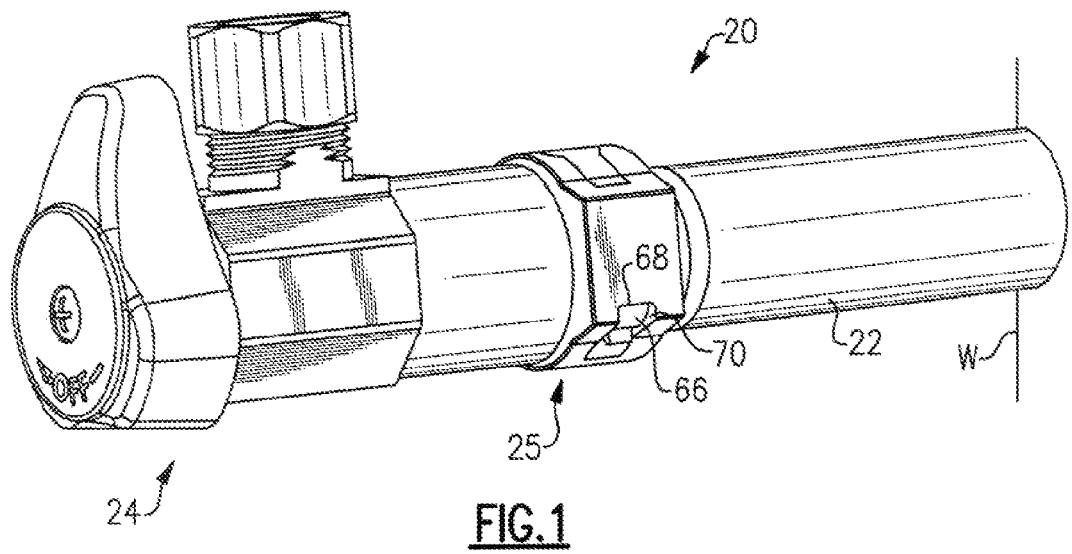
FIG. 1 is a general perspective view of a stub-out assembly of the present invention.

FIG. 1 illustrates a general perspective view of a stub-out assembly 20. The stub-out assembly 20 includes a stub-out conduit 22 which typically extends through a wall W and is sealed with a valve assembly 24. The valve assembly 24 is mountable to the stub-out conduit 22 through a quick connect assembly 25 to selectively shut-off the stub-out conduit 22 during installation, for example only, of a plumbing fixture. It should be understood that various assemblies other than a vale assembly may be attached to the stub-out conduit with the mount housing 36 of the present invention.

Figure 2:
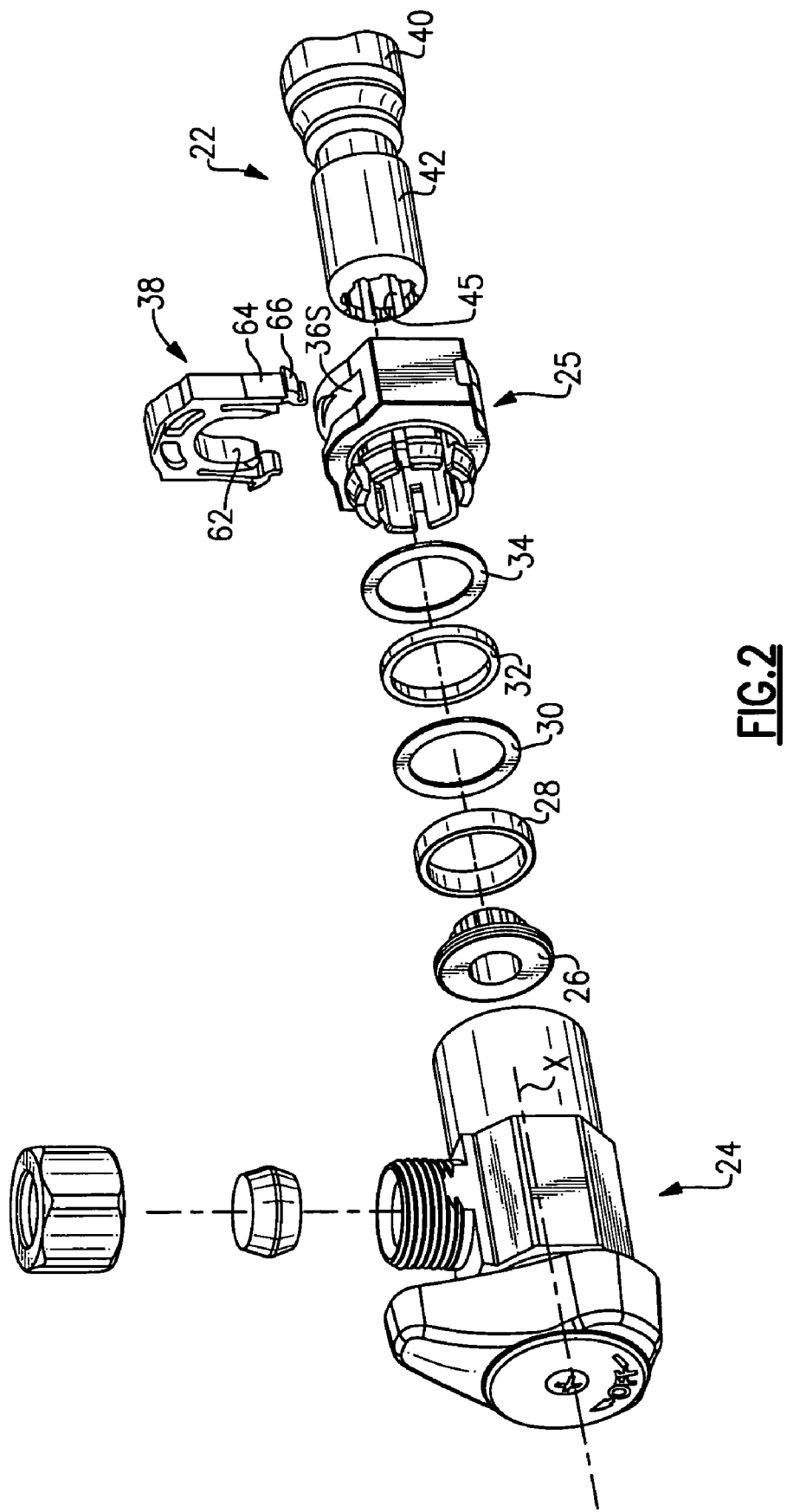
FIG. 2 is an exploded view of the stub-out assembly of the present invention.

Referring to FIG. 2, the quick connect assembly 25, generally includes an anti-rotation disc 26, an anti-rotation spacer 28, a first O-ring seal 30 (black), a spacer 32, an O-ring 34 (green), a mount housing 36, and a retainer 38 which fits within a mount housing slot 36S. Preferably, the valve assembly 24 may be readily attached to the stub-out conduit 22 without tools or brazing as has been heretofore required.

The stub-out conduit 22 generally defines a major diameter 40 and a minor diameter 42. The minor diameter 42 defines an attachment groove 44 for receipt of the retainer 38. An internal structure 45, such as a multitude of splines, are engageable with the anti-rotation disc 26 to rotationally fix the valve housing 24 on the stub-out conduit 22 (FIG. 3A). The anti-rotation structure may be achieved through various geometric shapes that interlock or interface with mating geometry located between the valve housing 24 and the stub-out. For fluid connection systems, the optional anti-rotation feature may utilize, for example only, hex, dimples, ribs, splines, flats, knurls, or the like.

Figure 5:
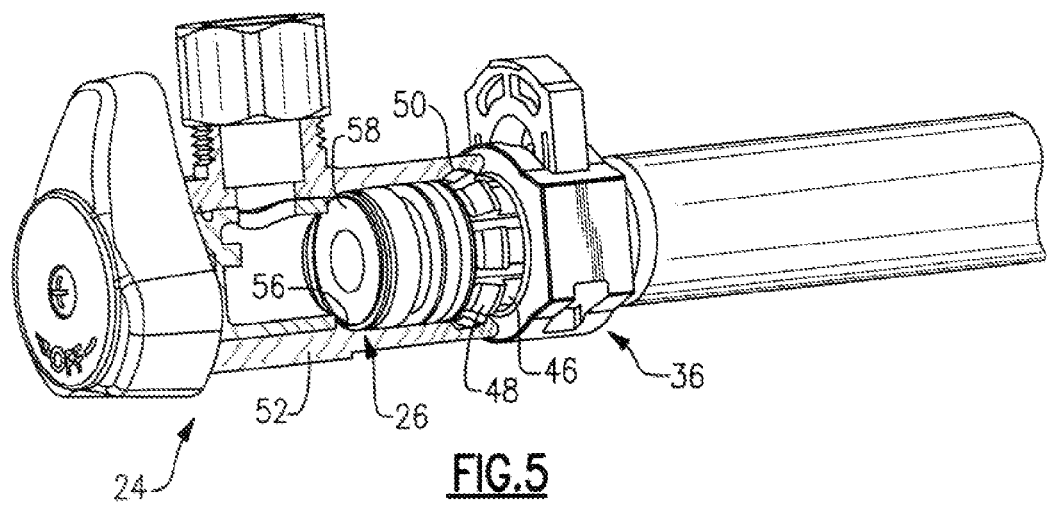
FIG. 5 is a general partial sectional perspective view of a stub-out assembly of the present invention.

Referring to FIG. 3A, the mount housing 36 includes a multitude of circumferential fingers 46 defined about a longitudinal axis X. Each finger 46 includes a barbed end 48 (FIG. 5). The barbed end 48 engages a corresponding internal groove 50 within a valve housing 52 of the valve assembly 24 (also illustrated in FIG. 3A). The barbed end 48 further defines a stop surface 55 which axially retains the first O-ring seal 30, the spacer 32 and the O-ring 34 within the valve housing 52 (best seen in FIG. 3A).

Figure 6A:
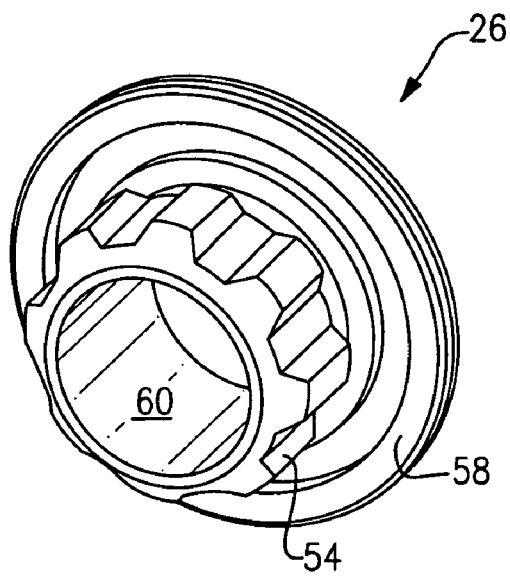
FIG. 6A is a perspective view of an anti-rotation disc.
Figure 6B:
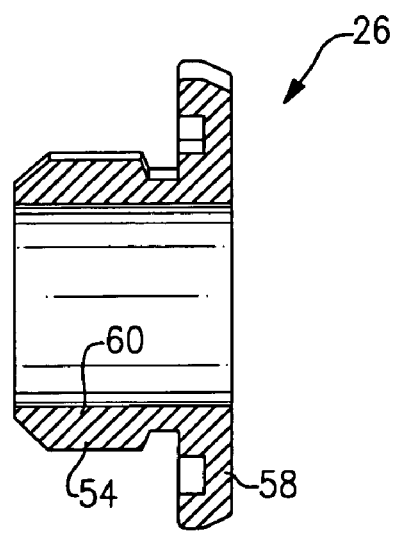
FIG. 6B is a longitudinal sectional view of the anti-rotation disc of FIG. 6A.

The anti-rotation disc 26 includes a radial flange 58 which extends from a tubular member 60. The tubular member 60 defines an external anti-rotation structure 54 such as a multitude of splines (FIGS. 6A and 6B). The external anti-rotation structure 54 may utilize, for example only, hex, dimples, ribs, splines, flats, knurls, or the like.

The tubular member 60 with the anti-rotation structure 54 is located at least partially within the stub-out conduit 22 to engage the internal anti-rotation structure 46, while the first O-ring seal 30, the spacer 32 and the O-ring 34 are compressed between the outer diameter of the minor diameter 42 and an inner diameter 56 of the valve housing 52 to provide a water-tight seal therebetween (FIG. 3B). The radial flange 58 is wedged into the inner diameter 56 of the valve housing 52 to rotationally fix the valve housing 24 to the stub-out conduit 22. That is, the anti-rotation disc 26 permits the mount housing 36 to be received at least partially within the valve housing 52 to rotationally locate the valve assembly 24.

Figure 3D:
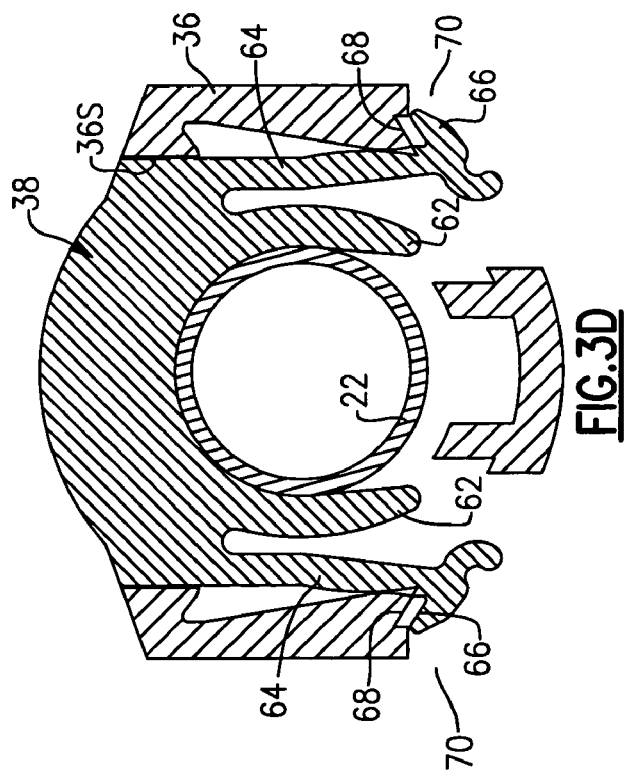
FIG. 3D is a sectional view taken at line 3D-3D in FIG. 3C.
Figure 3C:
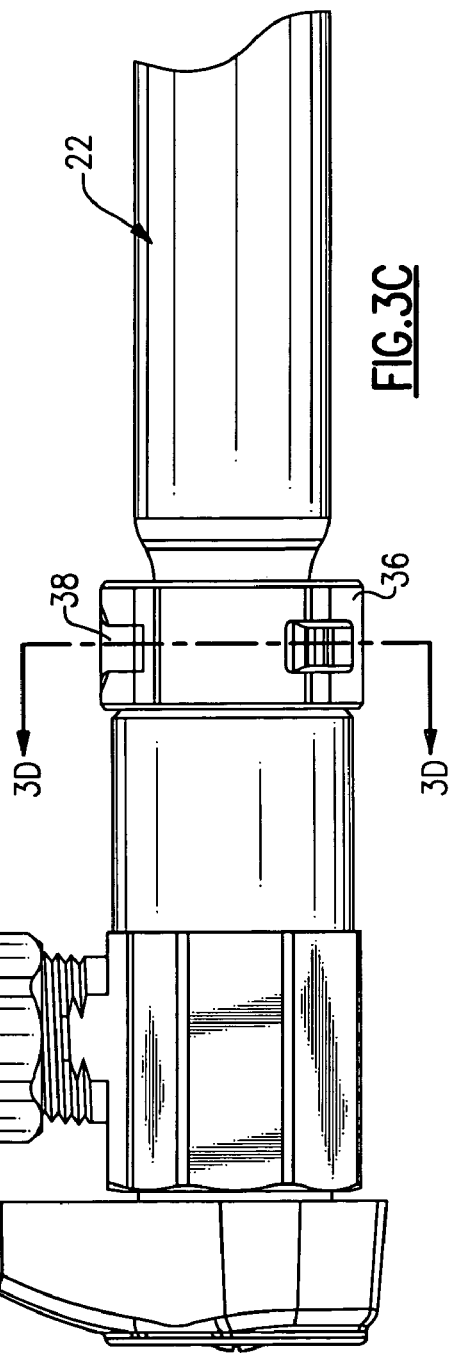
FIG. 3C is a side view of the stub-out assembly.
Figure 7:
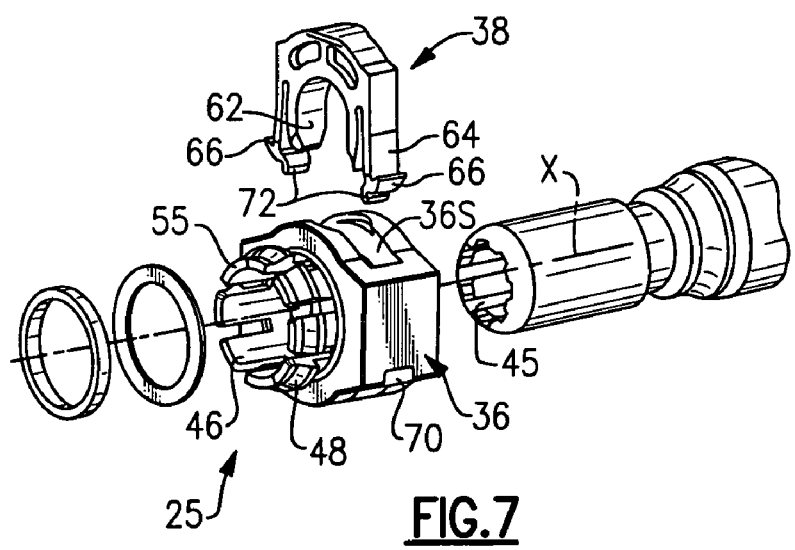
FIG. 7 is an expanded perspective view of the quick connect assembly of the stub-out assembly.

The mount housing 36 fits over the minor diameter 42 and the retainer 38 is aligned with the attachment groove 44. The retainer 38 includes a partially annular set of conduit attachment legs 62 and a set of housing attachment legs 64 which are defined within a common plane P (also illustrated in FIGS. 3D and 7). The conduit attachment legs 62 engage the attachment groove 44 to axially retain the conduit 22 therein. The housing attachment legs 64 each include a barbed end 66 which engage a corresponding surface 68 located within the slot 36S (FIGS. 1 and 3B).

To attach the valve assembly 24 to the conduit 22, the mount housing 36 is fitted over the minor diameter 42 and the retainer slot 36S is aligned with the attachment groove 44. The retainer 38 is then pressed into the slot 36S such that the conduit attachment legs 62 extend around and at least partially within the attachment groove 44 while the housing attachment legs 64 are flexed inward in response to interaction between the barbed end 66 and the slot 36S. Once the barbed ends 66 have reached a relief 70 in the slot 36S, the housing attachment legs 64 spring outward such that the barbed ends 66 engage the corresponding surface 68 to lock the retainer 38 into the slot 36S (FIG. 3B-). Such a locking arrangement permits the rapid attachment of the valve assembly 24 to a stub-out conduit 22.

Preferably, a finger extends 72 from each barbed end 66 to facilitate compression of the housing attachment legs 64 toward each other such that the retainer 38 may be retracted from within the slot 36S in a direction opposite from which the retainer 38 was inserted.

Referring to FIG. 4A, the stub-out conduit 22 may initially include a test cap assembly 74 to provide a sealed end so the roughed-in plumbing may be thoroughly checked for leakage during the early construction of the dwelling. The test cap assembly 74 generally includes a test cap 76, a first O-ring seal 30T, a spacer 32T, and an O-ring 34T. The spacers and seals are generally as described above. The test cap 76 includes a corresponding internal groove 50T (also illustrated in FIG. 4C) to receive the barbed ends 48 of the multitude of circumferential fingers 46 of the mount housing 36 as described above to affix the test cap assembly 74 thereto.

A plumber is generally required to pressure test a plumbing system after installation is complete. The test cap assembly 74 is mounted on the stub-out conduit 22 until a later time (as shown in the other figures) in the construction process. At that later point, the test cap assembly 74 is removed by retracting the retainer 38 in a manner generally as described above. It should be understood that various end-forms and test caps arrangements which are later removed will also be usable with the present invention.

It should be understood that relative positional terms such as "forward," "aft," "upper," "lower," "above," "below," and the like are with reference to the normal operational attitude of the vehicle and should not be considered otherwise limiting.

It should be understood that although a particular component arrangement is disclosed in the illustrated embodiment, other arrangements will benefit from the instant invention.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A fluid quick connect assembly mountable to a stub out conduit with an internal anti-rotation structure comprising:
    a mount housing having a multitude of circumferential fingers defined about an axis and a slot generally transverse to said axis;
    a retainer mountable at least partially within said slot, said retainer having a set of conduit attachment legs and a set of housing attachment legs defined within a common plane, said set of housing attachment legs engageable with a corresponding surface within said slot to retain said retainer within said mount housing;
    a valve assembly having an internal groove, said multitude of circumferential fingers engageable with said internal groove to attach said mount housing to said valve assembly; and
    an anti-rotation disc mounted within said valve assembly, said anti-rotation disc engageable with said stub-out conduit to rotationally fix said valve assembly to said stub-out conduit, said anti-rotation disc includes a radial flange and a tubular member, said tubular member having an external anti-rotation structure engageable with the internal anti-rotation structure of said stub-out conduit.

2. The assembly as recited in claim 1, wherein each of said multitude of circumferential fingers includes a barb.

3. The assembly as recited in claim 1, wherein each of said set of housing attachment legs includes a barb engageable with said corresponding surface.

4. A stub-out assembly comprising:
    a stub-out conduit having an attachment groove and an internal anti-rotation structure of said stub-out conduit;
    a mount housing having a multitude of circumferential fingers defined about an axis and a slot generally transverse to said axis; and
    a retainer mountable at least partially within said slot, said retainer having a set of conduit attachment legs and a set of housing attachment legs defined within a common plane, said set of conduit attachment legs engageable with said attachment groove and said set of housing attachment legs engageable with a corresponding surface within said slot to retain said stub-out conduit within said mount housing;

a valve assembly having an internal groove, said multitude of circumferential fingers engageable with said internal groove to attach said mount housing to said valve assembly;

an anti-rotation disc mounted within said valve assembly, said anti-rotation disc engageable with said stub-out conduit to rotationally fix said valve assembly to said stub-out conduit, said anti-rotation disc includes a radial flange and a tubular member, said tubular member having an external anti-rotation structure engageable with said internal anti-rotation structure of said stub-out conduit.

5. The assembly as recited in claim 4, further comprising a seal between said radial flange and a stop surface defined by said multitude of circumferential fingers.

6. The assembly as recited in claim 4, wherein said internal anti-rotation structure include a multitude of splines.

7. A stub-out assembly comprising:

a stub-out conduit having an internal anti-rotation structure and an attachment groove;

a mount housing having a multitude of circumferential fingers defined about an axis and a slot generally transverse to said axis;

a retainer mountable at least partially within said slot, said retainer having a set of conduit attachment legs and a set of housing attachment legs, said set of conduit attachment legs engageable with said attachment groove and said set of housing attachment legs engageable with a corresponding surface within said slot to retain said stub-out conduit within said mount housing;

a valve assembly attachable to said mount housing;

an anti-rotation disc mounted within said valve assembly, said anti-rotation disc engageable with said stub-out conduit to rotationally fix said valve assembly to said stub-out conduit, said anti-rotation disc includes a radial flange and a tubular member, said tubular member having an external anti-rotation structure engageable with said internal anti-rotation structure of said stub-out conduit.

8. The assembly as recited in claim 7, wherein said stub out conduit defines a major diameter and a minor diameter less than said major diameter, said minor diameter having said attachment groove.

9. The assembly as recited in claim 7, further comprising a removable test cap assembly engageable with said attachment groove.

10. The assembly as recited in claim 9, wherein said removable test cap assembly comprises:

a mount housing having a multitude of circumferential fingers defined about an axis and a slot generally transverse to said axis;

a retainer mountable at least partially within said slot, said retainer having a set of conduit attachment legs and a set of housing attachment legs defined within a common plane, said set of housing attachment legs engageable with a corresponding surface within said slot to retain said retainer within said mount housing; and a test cap having an internal groove, said multitude of circumferential fingers engageable with said internal groove to attach said test cap to said mount housing.

* * * * *